US007239346B1

(12) United States Patent
Priddy (10) Patent No.: US 7,239,346 B1
(45) Date of Patent: Jul. 3, 2007

(54) SYSTEM AND ARCHITECTURE THAT SUPPORTS A MULTI-FUNCTION SEMICONDUCTOR DEVICE BETWEEN NETWORKS AND PORTABLE WIRELESS COMMUNICATIONS PRODUCTS

(76) Inventor: Dennis G. Priddy, 148 Meetinghouse Rd., Bedford, NH (US) 03110

( * ) Notice: Subject to any disclaimer, the term of this patent is extended or adjusted under 35 U.S.C. 154(b) by 0 days.

(21) Appl. No.: 09/420,459

(22) Filed: Oct. 18, 1999

(51) Int. Cl.
*H04N 5/225* (2006.01)
*H04L 9/00* (2006.01)
(52) U.S. Cl. .................................. 348/220.1; 713/186
(58) Field of Classification Search ............ 348/220.1, 348/207.1, 14.01; 705/23, 26, 27; 455/422.1, 455/556.1; 382/117
See application file for complete search history.

(56) References Cited

U.S. PATENT DOCUMENTS

| 3,984,625 | A |  | 10/1976 | Camras ....................... 178/5.6 |
| 4,884,132 | A |  | 11/1989 | Morris et al. ................. 358/93 |
| 5,128,755 | A |  | 7/1992 | Fancher ....................... 358/108 |
| 5,144,649 | A |  | 9/1992 | Zicker et al. ................ 379/59 |
| 5,264,935 | A |  | 11/1993 | Nakajima ................... 358/181 |
| 5,488,558 | A |  | 1/1996 | Ohki .......................... 364/449 |
| 5,544,320 | A |  | 8/1996 | Konrad ................... 395/200.09 |
| 5,581,630 | A |  | 12/1996 | Bonneau, Jr. ............... 382/116 |
| 5,666,159 | A |  | 9/1997 | Parulski et al. ............. 348/211 |
| 5,737,491 | A |  | 4/1998 | Allen et al. ................. 395/2.79 |
| 5,754,655 | A |  | 5/1998 | Hughes et al. ................ 380/24 |
| 5,790,977 | A |  | 8/1998 | Ezekiel ....................... 702/122 |
| 5,809,415 | A |  | 9/1998 | Rossmann .................. 455/422 |
| D405,457 | S |  | 2/1999 | Kawashima ................ D16/208 |
| 5,887,266 | A |  | 3/1999 | Heinonen et al. ........... 455/558 |
| 5,899,980 | A |  | 5/1999 | Wilf et al. ................... 705/206 |
| 5,917,542 | A |  | 6/1999 | Moghadam et al. ........ 348/207 |
| 6,016,476 | A | * | 1/2000 | Maes et al. ..................... 705/1 |
| 6,317,609 | B1 | * | 11/2001 | Alperovich et al. ...... 455/556.1 |
| 6,332,193 | B1 | * | 12/2001 | Glass et al. ................. 713/170 |
| 6,377,699 | B1 | * | 4/2002 | Musgrave et al. .......... 382/117 |
| 6,512,919 | B2 | * | 1/2003 | Ogasawara ............... 455/422.1 |
| 6,668,055 | B2 | * | 12/2003 | Marwell et al. ........ 379/265.13 |
| 6,879,340 | B1 | * | 4/2005 | Chevallier ............. 348/207.99 |

FOREIGN PATENT DOCUMENTS

EP 0924657 * 6/1999

* cited by examiner

*Primary Examiner*—Lin Ye
*Assistant Examiner*—Luong T. Nguyen
(74) *Attorney, Agent, or Firm*—Orrick Herrington & Sutcliffe LLP (57) ABSTRACT

A system and architecture that supports an integrated imaging module for use between networks and portable communications products. The integrated imaging module contains a lens, memory, an input/output device, and a multi-function semiconductor device, such as a Complementary Metal-Oxide Semiconductor (CMOS). Within the design of the multi-function semiconductor device are the functions of still and full-motion digital imaging, image processing, automatic identification, a secure personal database, biometric attribute identification for access control, personal finance information, wireless communication protocols, general purpose processing, and memory. The module may be incorporated into any portable wireless communication product and used to capture text and image data for incorporation into a wireless transmission to a remote device.

19 Claims, 3 Drawing Sheets

SYSTEM AND ARCHITECTURE THAT SUPPORTS A MULTI-FUNCTION SEMICONDUCTOR DEVICE BETWEEN NETWORKS AND PORTABLE WIRELESS COMMUNICATIONS PRODUCTS

FIELD OF THE INVENTION

The present invention is directed to wireless communications, and more particularly to image capture by portable wireless communications products and wireless transmission of data related to the image to a remote location.

BACKGROUND OF THE INVENTION

Ornamental designs that incorporate digital cameras with cellular telephones and a portable computer into a single housing are known in the art. One example of such a design is shown in U.S. Pat. Des. 405,457 issued Feb. 9, 1999, to Kawashima. A cellular telephone is illustrated essentially affixed to the side of a digital camcorder with each unit interfaced to a central processor, yet for all purposes, each component operates independently of the other. This design is deficient in that the capabilities of the three identified components are not functionally integrated and each is unable to take advantage of the features and benefits of the others. Another example is found in U.S. Pat. No. 5,917,542 issued Jun. 29, 1999, to Moghadam, et al., which refers to a system and method for digital image capture and transmission. A digital camera containing a short term and long term memory capability is combined with a wireless communication means for transmitting individually captured digital images. The design is effective in determining signal strength and assuring successful transmission of an image, but deficient in that the device does not provide the capabilities of automatic identification, voice communication, or other interactive business functions. Other examples of the wireless transmission of video images are also known in the art. In U.S. Pat. No. 4,884,132 issued Nov. 28, 1989 to Morris, et al., a security camera is disclosed that captures images and relays those images to remote stations via wireless transmission. However, the Morris patent is directed to the transmission of video images and does not provide users with a range of complementary functionality.

Numerous examples exist showing various portable computer terminals; some with integrated communication means and a means for reading bar codes. These terminals include large on-board memory capacity, allow for the reading of bar codes and subsequent wireless transmission of the decoded information to a remote site. These terminals are deficient in that they are dedicated to the art of automatic identification and do not provide for the cumulative capability of automatic identification, two-way voice communication, transmission of instantly captured digital images, and the conduct of electronic commerce and personal finance activities, and the advantages appurtenant to such a combination.

Methods for augmenting the functionality of mobile telephones are also known in the art. U.S. Pat. No. 5,887,266 issued Mar. 23, 1999 to Heinonen, et al., discloses a method for using applications in a mobile station. The method requires an application-bearing module, such as a removable PCMCIA memory card, to be physically inserted into and connected with the mobile station or telephone. The application software is then allowed to interact with the mobile station operating system to execute the application. Through this, the on-board memory capacity of the mobile station is effectively increased to allow the inclusion of application software. Unfortunately, this technique also limits the number of applications, and the size of the applications, to only those that can reside fully within the capacity of the removable memory card.

Remote access to or from networked computers is also known in the art. U.S. Pat. No. 5,544,320 issued Aug. 6, 1996, to Konrad refers to a system for access to remote information services. Employed is the concept of distributed processing wherein the architecture specifically avoids providing functionality to a component that is the primary responsibility of another component and, specifically, envisions that the local host be a local multi-user computer system, a workstation, or a Personal Computer. The disclosed design and architecture precludes user mobility, requires significant computer memory, processing power, detailed user input, and a wired telecommunications interface resident at the local host. In U.S. Pat. No. 5,790,977 issued Aug. 4, 1998, to Ezekiel, a host computer system is provided containing access to a remote instrument. In response to a request from the control and data acquisition software running on the host system, data acquired by the remote instrument is forwarded to the host system. This system is deficient in that the remote data acquisition instrument acts as a single purpose slave device unable to perform multiple applications or serve as a means of independently activating functions resident on the remote host computer system.

OBJECTS AND SUMMARY OF THE INVENTION

It is, therefore, an object of the present invention to overcome the above deficiencies of the prior art and provide users of wireless telecommunications technology an enhanced utility and functionality without diminishing or altering the original capabilities of the host portable two-way communication device.

Broadly, the present invention is directed to a self-contained integrated imaging module, which is designed to be incorporated into any number of portable host products and which enables users of these products to "see," "speak," "show" images, and securely exchange personal or business information with other people and computers. Suitable host products include, but are not limited to, cellular/satellite telephones, wireless empowered Personal Digital Assistants (PDA), portable computers, portable automatic identification terminals, and the like. Miniaturized two-way portable communication devices are preferred. The integrated imaging module preferably includes, among other things, a fully integrated semiconductor device, such as a Complementary Metal-Oxide Semiconductor (CMOS), which enhances host product productivity and capability by allowing users to execute remotely virtually any function. By use of such an integrated imaging module, one can convert an instant personal objective into a machine executable action at a remote location, which may be physically distant or proximate to the user at the time of execution.

Among the productivity and capability enhancements obtained by the present invention are one or more of the following:

1. enabling distributed and/or parallel processing of multiple applications within the host product;
2. providing the functions of still and full-motion image capture and processing;
3. automatic identification decoding capability employing imaging means;

4. secure storage of personal information such as credit/debit card numbers;
5. biometric verification as a gate to access personal database information;
6. execution of personal financial transactions;
7. wireless interface protocols for peripheral devices, the Internet and other networked computer systems; and
8. optimally formatted images and textual information in preparation for two-way transmission via wireless means.

Advantageously, the integrated imaging module of the present invention adds such features, functionalities, and capabilities without diminishing the available memory, computing performance, or previously existing functionality of the host product.

The resultant portable communications product, enhanced by the integrated imaging module (also referred to herein as the "module") in accordance with a preferred embodiment of the invention, is able to provide users with the following variety of structures implementing the above-noted functions.

A remote voice and/or data communications interface capability via a wireless communication channel to a networked computer server, such as by using a cellular telephone and/or satellite network telephone. This includes the ability to receive television or other digital image broadcasts from, for example, corporate or private wide-area and local-area networks, or the Internet.

Another implementation is to provide remote activation or initiation of functions on computer peripherals, distant servers, or consumer appliances, preferably in a secure manner, whereby only authenticated individuals can execute such functions, thereby achieving a distributed processing function. Preferably, the module can also provide for the generation of a unique digital security/authentication code, such as an electronic or digital signature, or a digital token or the like. Such a code can then be transmitted along with a resource locator address to a remote server computer to provide the user with access to certain application software, data or remote control of a remote device. The latter is optionally achieved after the user's identity is authenticated or an access code or personal identification code is identified. Data transmissions may be in an encrypted or non-encrypted format, with the module or host device on the one hand, and the remote device on the other hand, having suitable encryption/decryption functionalities.

Another implementation is to provide a secure memory mode of operation. In this, the module contains personal identification data including, for example, credit card/debit card account information, bank account, driver's license number, social security number and the like for executing securely financial transactions. In this regard, the module enhanced product allows the user to execute a secure purchase of non-electronic commerce goods and services.

An alternate and preferred embodiment of a secure memory mode implementation also provides for biometric verification/authentication as a gate for accessing and subsequently authorizing transmission of personal data related to financial transactions. Biometric verification also can provide for other secure functions, e.g., access to secret or hidden computer files. If the correct biometric or authentication information is not provided, access to the personal data is denied.

Another implementation of the module is to provide an imaging means to automatically scan, decode, and transmit, via wireless communication networks, information encoded in bar codes and other automatic identification indicia, including Optical Character Recognition (OCR).

Still another implementation is to provide an interface to and exchange information with Smart Cards and Radio Frequency Identification Tags (RFID).

A further implementation is to provide capture of a single digital image or sequential digital images and to transmit the same via a wireless communication channel to a remote location. This can be for purposes of remote storage or forwarding of the captured image, or the participation in video teleconferences in real time.

Thus, the device of the present invention is preferably able to transmit queries, receive textual and graphic responses, execute secure purchase of goods or services, and remotely store records related to electronic commerce transactions.

As will be understood by a person of ordinary skill in the art, the functions and capabilities of the device may be activated via the use of physical buttons on a keypad, electronic buttons or menus on a display screen, automatic data sensing, or voice activated commands, as deemed suitable or as may be available with the host product.

In another embodiment, a "car kit" is provided as part of a system including the integrated imaging module enhanced host product. In this embodiment, the car kit incorporates a relatively large-size display screen, suitable for viewing downloaded map images while driving and for displaying an alphanumeric keyboard image or icon graphic user interface for touch-sensitive data entry. In this regard, the car kit features are preferably activated when a portable two-way communication device incorporating the integrated imaging module is placed in a complementary holder adapted to interface with the communication device and thus provide an auxiliary input and display.

The open system architecture and interface protocols similar to that of U.S. Pat. No. 5,809,415 issued Sep. 15, 1998, to Rossmann are generally known to persons skilled in the art and may be used to facilitate generalized wireless access to secure remote closed-system entry nodes. This transmission protocol, used in conjunction with the features and benefits of the imaging module herein disclosed, provides a multi-layered security procedure that ensures each transmission is from an authorized portable two-way communication device, and that the activating user is indeed the authorized individual. Once the user is authenticated, access to the remote closed system is granted, thereby completing the communications link. As a result, the portable communications device is empowered with the memory, speed, processing power, and application functionality of every computer within the remote closed system (e.g., a network). Through this architecture, which is believed to be within the abilities of a person of ordinary skill in the art to construct, the holder of each portable two-way communication device, enhanced with the imaging module in accordance with the present invention, has available—preferably in their hand in a miniature device—every database and productivity enhancing software system resident on any network throughout the world. The reference to a "miniature" device is to include such conveniently portable items as cellular telephones, personal digital assistants, portable computer terminals, and the like.

BRIEF DESCRIPTION OF THE DRAWINGS

These and other advantages, features, and characteristics of the invention will become apparent to a person of ordinary skill in the art in view of the following detailed discussion of preferred embodiments of the present invention, made with reference to the accompanying drawings, in which like reference characters refer to like elements, and in which.

DETAILED DESCRIPTION OF THE INVENTION

Figure 1:
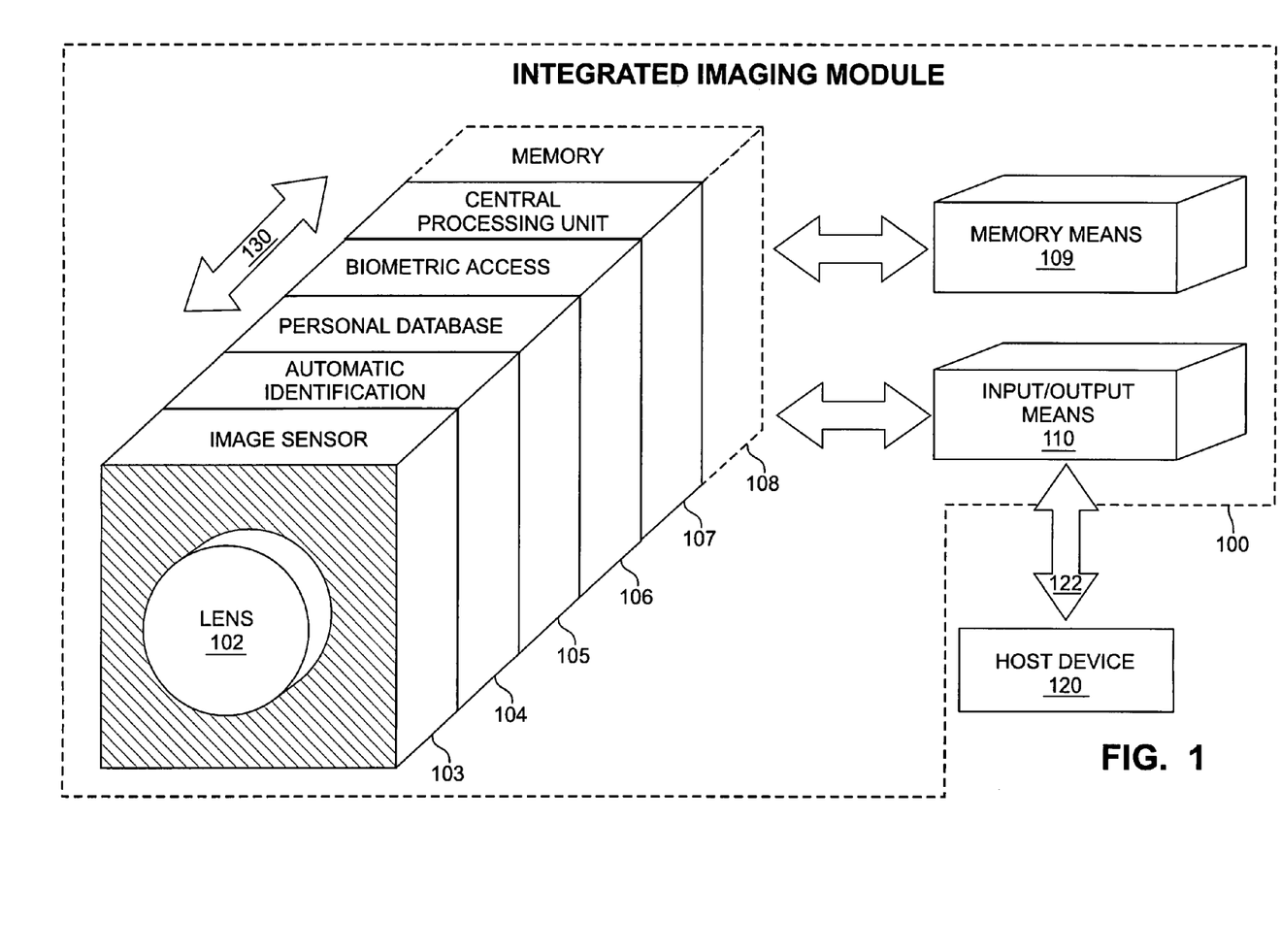
FIG. 1 illustrates a block diagram of the components and elements comprising the integrated imaging module in accordance with a preferred embodiment of the present invention.

With reference to FIG. 1, the integrated imaging module 100 of the present invention, is fully self-contained and requires a host portable communications device 120 to supply only an interface 122 and power (not shown). The interface 122 and power can be conveyed to the integrated imaging module 100 either via an internal bus connection to a host device controller board (not shown) or via an external RS232 port of the host (not shown). Module 100 includes a lens assembly 102, which may be comprised of either a single fixed lens, or multiple fixed, extendable, or moveable lens elements. Lens assembly 102 is preferably placed forward of a multi-layered semiconductor device 130. The semiconductor device 130, preferably constructed as a Complementary Metal-Oxide Semiconductor (CMOS) integrated component, has an image sensor layer 103, an automatic identification layer 104, a personal database layer 105, a biometric access layer 106, a central procession unit layer 107, and optionally a memory layer 108 (shown in phantom lines in FIG. 1).

Layer 103 contains an imaging sensor disposed external to the die. Image sensor 103 is conventionally comprised of multiple light sensitive pixels capable of discerning light intensity, and an integrated image processing circuit which converts the analog values of reflected light intensity from each pixel into instant digital values. The digital values are then collected and stored, e.g., in memory 108, to correspond to the spatial image sensed by the imager sensor 103. This creates a machine-understandable digital image.

The captured digital image may then be interrogated or processed based on a user-selected command, as appropriate to the desired application. Digital images may be transferred singly or in rapid succession via input/output means 110 to the host device 120 for wireless transmission to a remote location, or retained for processing. Automatic identification layer 104 may be invoked and executed to process the captured digital image to determine the presence of automatic identification indicia within the digital image. If automatic indicia are found, the information contained therein can then be decoded and transferred to the host device 120 via input/output means 110 for display and/or wireless transmission. In addition, the automatic indicia could enable the host device 120 to execute an application that requires an authorized input code, for example, a coded employee identification card to enable wireless communications.

Also included in device 130 is layer 105 which is a secure memory area designed to contain the user's sensitive personal information, such as credit card and debit card account numbers, bank checking account numbers, social security numbers, passwords, etc. Access to layer 105 may only be achieved after first passing through an authentication gate, for example, layer 104 as described above or layer 106. In this regard, layer 106 is a secure memory area designed to contain user-specific biometric data, such as digital values related to fingerprint minutia, retina scans, voice prints, DNA or, conceivably, another form of complex Personal Identification Code ("PIN"). Preferably, once layer 106 is initialized, neither it nor the information contained in layer 105 can be changed or accessed without a subsequent identical match. In the event someone attempts to alter the data contained in layer 106, without first scanning or keying an identical match, the information contained in layer 105 can be automatically be locked or erased. For example, a failure to match may lock layer 106 for a given time and multiple failures to match in succession during a given time period may cause erasure. Further, any time personal data from layer 105 is transmitted it will be accompanied by, and encrypted with or authenticated by, the biometric "image" entered by the user and validated by the reference data contained in layer 106. In this manner, the receiving communication node can also validate both the incoming account information and the biometric image of the initiating user within its own database by decoding the encrypted biometric image or by verifying the authenticity of the transmitted data. For example, authentication may occur using well known digital signatures made of a hash of the biometric data, and regenerating the hash and comparing it to the transmitted hash to establish authenticity. It should be understood that the reference to biometric "image" is a broad reference that includes both graphic images and electronic data corresponding to, but not actually generating, such an image. In the case that the biometric image received does not match the reference biometric image, the received image can be stored, flagged, transmitted to a remote device (e.g., an FBI computer) and used later to search law enforcement biometric databases for the actual identity of the individual initiating the potentially fraudulent transaction. Similarly, if the biometric image cannot be authenticated, the received data can be saved and used to track the fraudulent user. Referring to the central processing layer 107, it provides general purpose processing capability for interpreting and executing commands between the host device and the integrated imaging module, manipulating data, executing digital zoom algorithms, and providing additional intelligence and processing power for implementing wireless interface protocols and Internet message formatting.

Various wireless protocol libraries, Internet browsers, menus, and other non-sensitive data can be stored in memory layer 108 or alternately or in addition, in a supplemental memory 109. Memory layer 108 and supplemental memory 109 (collectively "memory") also may serve as a transmission storage buffer, as necessary, during wireless transmission of large image or data files by or to the host device 120.

Figure 2:
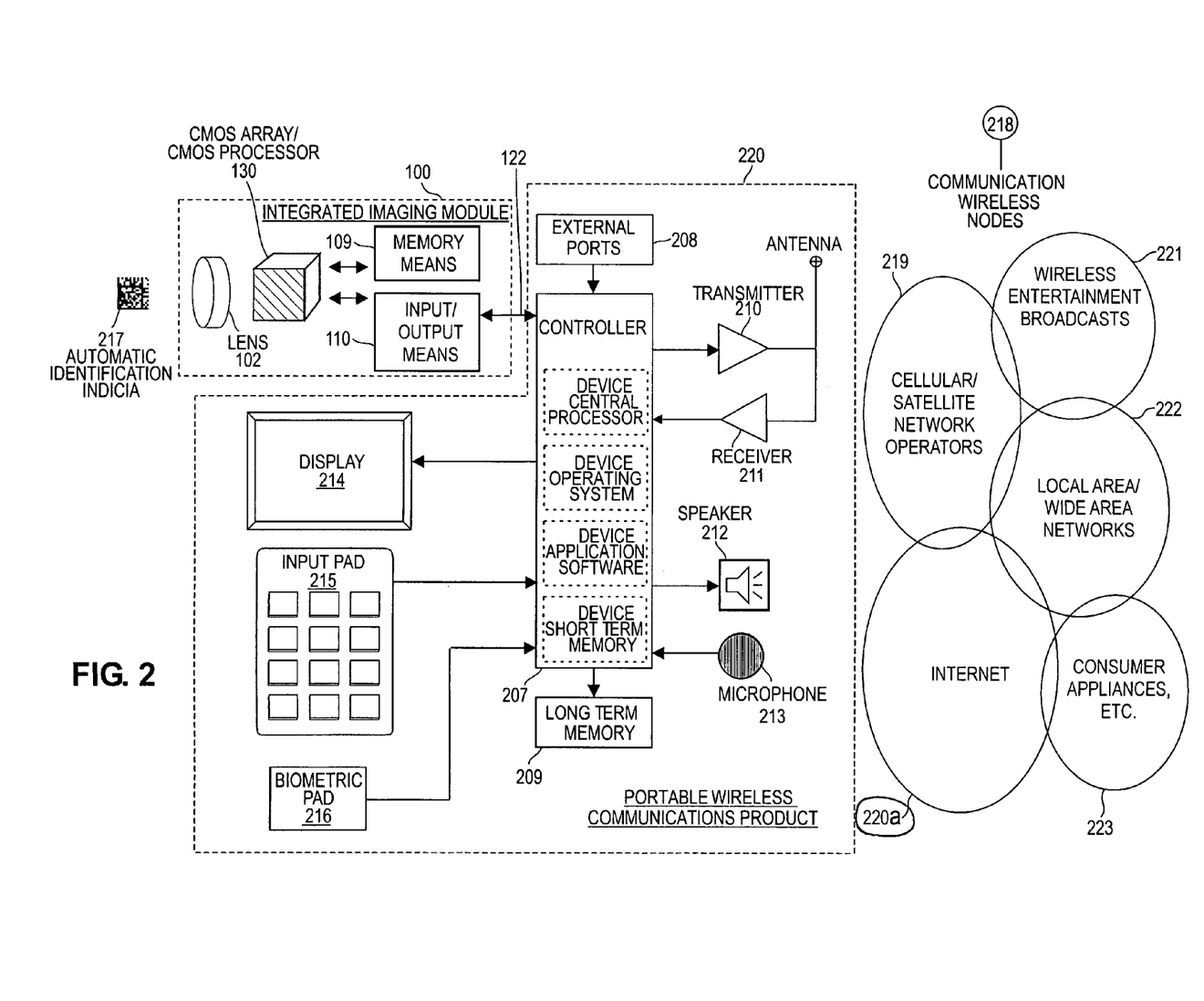
FIG. 2 illustrates the integrated imaging module of FIG. 1 used in conjunction with a portable wireless communications device and interfacing to various wireless communications networks.

Referring to FIG. 2, an integrated imaging module 100 is preferably incorporated within or as part of host device 120, which is illustrated as a portable wireless communications device 220 using an internal electronic bus connection 122. Portable wireless communications device 220 may be, for example, cellular or satellite telephones, such as a Nokia model 9000il or a NeoPoint model 1000; a wireless empowered Personal Digital Assistant (PDA) such as a 3Com Palm model Pilot III, IV, V, VII or like devices; a wireless empowered portable computer such as a Compaq Presario, Sony Vario, Apple PowerBook and the like; a portable automatic identification terminal such as a Telxon PTC-960LE or a Symbol Technologies SPT 1700; or the like. Imaging module 100, as more fully described with reference to FIG. 1, is connected to portable wireless communications product 220 via a high-speed electronic bus 122 to host device controller board 207. Power to imaging module 100, as well as the exchange of instructions and data, are accomplished via this connection point.

Device 220 functions may be activated either by voice command via microphone 213, touch screen display 214, input pad 215, or scanning an automatic identification indicia 217 instruction set employing module 100. Display screen 214 also may be used to present visual output responses processed or received by the device 220, and input handwritten or typed messages, symbols and signatures. A user may selectively activate a wireless connection to one of the many nodes 218 or choose a function within device 220 that, in turn, will automatically activate a connection.

In an application where the user is making a purchase, for example, as discussed in more detail below, the value of the proposed purchase can be determined either by optically scanning and interpreting automatic indicia 217 printed on or adjacent to the product, or on a cash register receipt, or by manually inputting the amount via touch screen 214 or input pad 215. The user would then scan a biometric attribute, such as a fingerprint or retina on biometric pad 216 or display 214, reenter a comparative voice print in microphone 213, or the like, and initiate a comparison to the biometric reference data contained in layer 106 of semiconductor device 130.

If an identical match is made or authenticated, processor layer 107 will extract the credit or debit account information stored in layer 105, and combine it with the digital values of the biometric attribute then entered by the user, along with the amount being charged, forming an integrated message. The integrated message, including data element identifiers, is then returned to controller 207, along with a telephone number or Internet web address of the associated financial institution. Controller 207 also manages encryption (and decryption) of the data to be transmitted where appropriate. Controller 207 then forwards the message to a transmitter 210 for broadcast via cellular/satellite network node 219 directly or (via the Internet node 220a to the financial institution (See node 303g of FIG. 3). The financial institution node will then validate the user (typically employing the biometric attribute provided by the user as found in the integrated message) and account information received, validate instant credit worthiness, and accept or reject the transaction.

If the transaction is accepted, a debit is charged to the user's account and a credit is forwarded to the merchant's account with a transaction completion message being generated, forwarded and displayed on the merchant's local in-store terminal. Simultaneously, a user transaction identification record is generated and retained within the user's financial file at the financial institution and a message can be returned to the user via receiver 211 and display 214 (or audibly displayed via speaker 212 if so desired). If the transaction is rejected, however, a message so indicating is returned to both the merchant and the user. The message to the user could include a specific reason for the rejection and be viewed privately on display 214. If the transaction is rejected because the user could not be properly validated, the fingerprint data conveyed with the purchase request can be retained by the financial institution for later use by law enforcement to determine the true identity of the unauthorized requester. Further, the device 220 could be programmed to start a distinctive beeping indicating that a fraudulent transaction was attempted.

In an application where a user wishes to take a picture, a "Photo" option from a text or graphic menu displayed on portable wireless communications device 220 can be selected. This selection activates a command from controller 207 to semiconductor module 130 that, in turn, activates analog to digital processing of the reflected light being sensed by layer 103. Additionally, a wireless communication connection is made via network node 219 or Internet node 220a to an e-mail address or other networked repository. A subset of the pixel values sensed by layer 103 are captured and conveyed by processor layer 107 via input/output means 110 to controller board 207, causing a less than full resolution image to be displayed in real-time on display 214. Display 214 now functions as an imaging viewfinder for a digital camera function. Once the user frames the image to be captured, a button is depressed on input pad 215, or elsewhere on device 220, causing the instant digital image to be momentarily frozen on display 214 and causing the corresponding full resolution image to be stored in memory, preferably supplemental memory 109.

Processor layer 107 may now begin transferring either the full resolution image or a compressed version of the image, in a format such as JPEG or MPEG, to controller 207 and transmitter 210 for wireless broadcast. Controller 207 will interact with processor layer 107 to ensure that the rate of transfer from memory 109 corresponds to the rate at which transmitter 210 is able to broadcast. Once the image has been successfully broadcast and received, a suitable message can be returned from the network repository to device 220 for audio and/or visual display to the user. One preferred such message is to cause a file message to be superimposed over the image on display 214 indicating that "upload is complete." The user then may forward the already uploaded image to yet another web site, download the image back to device 220 for viewing on display 214, and/or retransmit the image to a local computer peripheral via an infrared transmitter contained in external port 208, or delete the image entirely.

If a user wishes to access the capabilities of the Internet, the "Browser" function is selected from the portable communications device 220 menu alternatives. This selection activates a command from controller 207 to layer 107 of semiconductor device 130. Layer 107 will cause the browser menus and command structure to be activated from memory layer 108 and/or supplementary memory 109 and the Internet menu options presented on display 214 via controller 207.

Simultaneously, a wireless communications link is established via controller 207 and transmitter 210 to the user's pre-selected Internet service provider node 220a.

In an implementation in which the user is shopping and wishes to compare item prices, the user may either enter the narrative description of the manufacturer and item of interest or scan the item identification code (e.g., a UPC) as contained in an automatic identification indicia. If scanning automatic identification indicia 217, the user would select the "Scan" option from a menu displayed on device 220, that would immediately activate the display screen viewfinder function as described above for the "Photo Menu Option." The user would then direct integrated imaging module 100 toward the automatic identification indicia 217, framing the indicia within the viewfinder, i.e., the display 214. Once in the field of view, the user would activate a button or other input on device 220, thereby capturing a digital image of the area containing the indicia 217.

Automatic identification layer 104 of semiconductor device 130 would then be invoked, causing a real-time digital search of the image as it is transferred from sensor layer 103 to processor layer 107 in an effort to locate any form of indicia therein. Any indicia 217 so located would be decoded and the information contained within the indicia would be displayed on display 214. If multiple symbols were decoded, the user may highlight the information desired to be compared and depress the "Send" key (e.g., a button) of device 220. This action will cause the highlighted information to be forwarded by controller 207 to transmitter 210 for wireless broadcast to the connected Internet web site. Once received at the web site node 220a, an Internet-wide search could be conducted for the identical item number, a list compiled, and the compiled list returned via receiver 211 and controller 206 to display screen 214. Additionally, the returned information could include the location of alternative stores that carry the same product within an n-mile radius of the user's present location, where "n" is a user selected distance. This can be accomplished either by a circuit, which cooperates with the Global Positioning System, that may be in or incorporated into device 220, or by determining the geographic location of the first relay tower used in the transmission by the user's network operator node 219.

Figure 3:
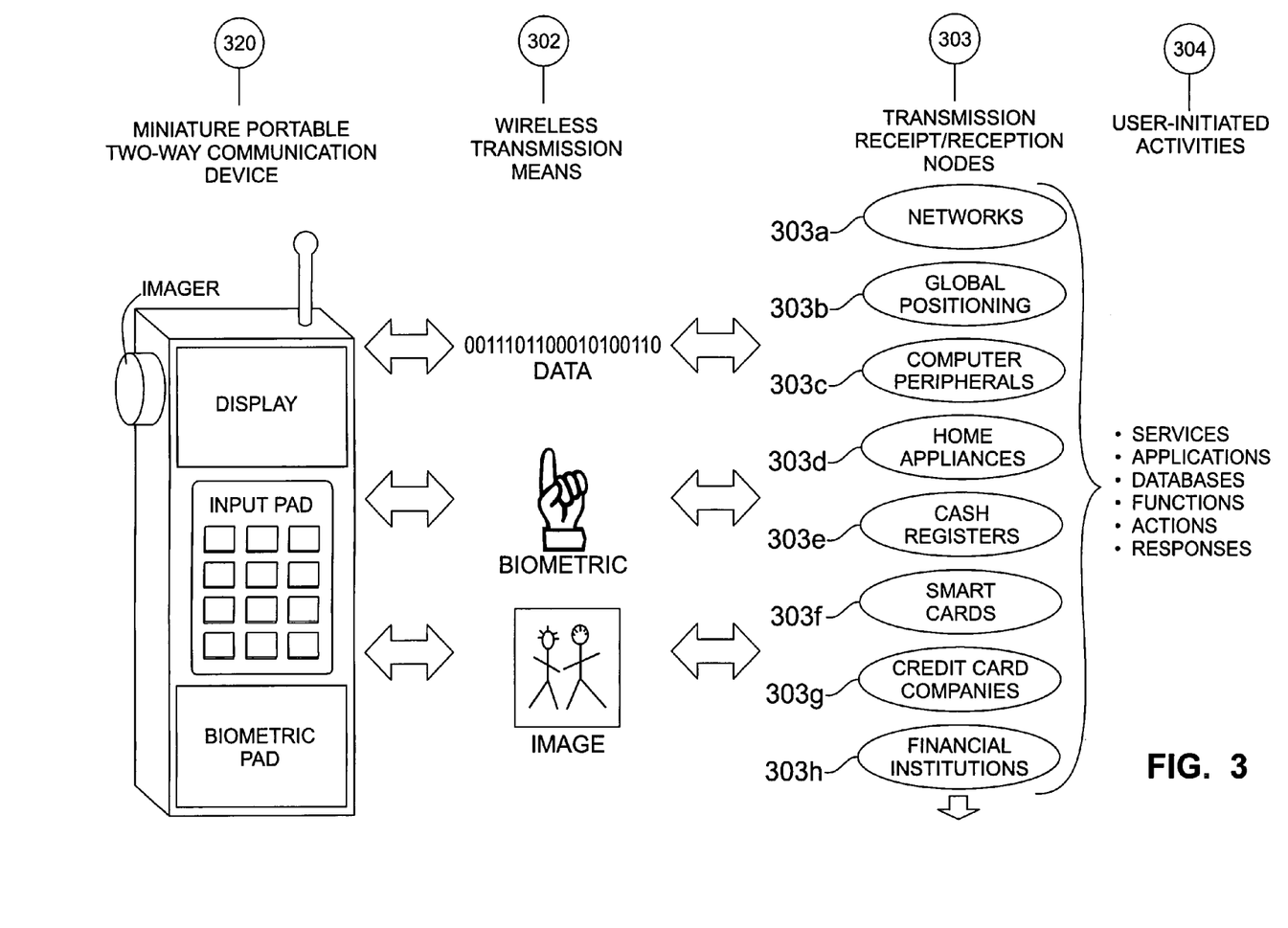
FIG. 3 illustrates a diagram of a functional system diagram with which the portable communications device of FIG. 2 interfaces via wireless channel to specific communication nodes which, in turn, contain certain user desired capabilities.

Referring to FIG. 3, a functional system architecture is disclosed wherein a miniature portable two-way communication device 320 transmits via wireless transmission channel 302 digital signals representing voice, data, biometric values, and/or digital images. Digital signal 302 is received selectively by communications node 303 and, in response to a command structure contained within digital signal 302, initiates appropriately an activity or function 304. Upon completion of the user-selected activity or function 304, a response is returned to portable communication device 320 via communication node 303 and wireless transmission channel 302.

As one skilled in the art will appreciate, the present invention provides a combination of features and capabilities that have broad consumer applications. In one such application, the device could be used for remote entry and query to electronic commerce on the Internet. If a user is at a store shopping for a specific product, and wishes to be assured of obtaining the most favorable price, the user can employ the communication device of the present invention to scan the product identification bar code on the product, speed-dial to a specific Internet web site, automatically up-load the scanned product number which would then initiate an Internet-wide search for the same item. On completion of the search, all prices compiled for that item (or selected prices, e.g., the best five prices), and the Internet addresses of where the prices were obtained, could be downloaded back to the device. Additionally, the name and address of alternative stores within an n-mile radius of the user's present location could be downloaded. Location identification is accomplished by use of either a Global Positioning System capability integrated into the communication device or by determining the location of the cellular communications tower first employed in the transmission of the signal.

Should the user at that moment opt to purchase the product via an Internet web site, the selected price/web site is highlighted, the user places a finger on the biometrics pad (or otherwise provides a biometric attribute) or keys a Personal Identification Code, and depresses a pre-programmed "Purchase" key. This action initiates a digital transmission to an Internet web site where user identification is authenticated, credit card or debit card information is again validated, and the order is placed. Alternately, the compiled price list could be used by the user to negotiate with the store where the product code was scanned to obtain a better price at that store.

Preferably, the digital transmissions, and particularly transmissions concerning purchases, are encrypted for transmission and decrypted upon receipt, using an accepted, conventional encryption/decryption technology. For example, public key—private key encryption such as RSA or Elliptical encoding/decoding.

In another application, the portable two-way communication device can be used as a personal cash register. In this circumstance, as the user selects items from a merchant's shelves, the product identification bar code on each selected item is scanned. Once shopping is complete, the user proceeds to the merchant's cash register at which time the user will enter a biometric attribute, for example, scan a fingerprint or retina or reenter and verify a voice print, or key their Personal Identification Code (PIN) into the device (or some combination of these), and then press a pre-programmed "Purchase" key. This action will initiate a secure communication means, such as an encrypted wireless telephone call, infra-red wireless line of sight connection, a radio frequency wireless connection, or a wired electronic bus connection, as appropriate, to the merchant's cash register, bank or financial clearinghouse. The accumulated product identification numbers will be transferred to the merchant's cash register or other designated site, along with the user's credit card or debit card information that is stored in the secure memory module. The merchant's cash register will determine the unit price for each item, debit its inventory, credit its sales, and transmit back to the user's communication device the total value of the purchase charged to the user along with a transaction identification code.

Alternatively, all items to be purchased could be scanned and tallied by the merchant whereupon an invoice or cash register receipt is presented to the user. The user could then scan the receipt employing the imaging and OCR capability of the communication device, or input a data (electronic or optical, wired or wireless) feed from the merchant's system, automatically interpret the amount being charged along with the merchant's communication link instructions, input a biometrics attribute or PIN, and press a pre-programmed "Purchase" key. This action will initiate a secure communication means, such as an encrypted wireless telephone call to the merchant's designated site and complete the purchase transaction. In this manner, the user's credit or charge authorizing means is never out of their possession or control and unauthorized seizure or duplication of the user's account information is impossible.

In yet another application, the portable two-way communications device could be used as a wireless imaging device for capturing and transmitting digital images. While a user is on Vacation/Holiday, or at a trade show, or the like, the imaging module integrated into the communications device can be fitted with a lens modifying diopter which would provide a wider field of view and/or greater depth of field, appropriate for the moment. By selecting a pre-programmed "Photo" or "Full Video" function on the communications device, single or sequentially scanned images can be captured and automatically up-loaded to a remote site or e-mail address for mass storage. This not only eliminates the need for a large on-board memory capacity within the communications device, which is preferably a miniature device, but also provides for the immediate sharing of captured images with others. Remotely stored images may then be downloaded for viewing on the user's or any authorized or permitted individual's portable two-way communications device, personal computer, or a television set (via a web-capable cable box). This feature accommodates both casual recreational use and the need for instant communication and image transmission from the scene of fast-breaking new events and/or matters of interest to business people.

In still another application, the portable two-way communications device could be used as a wireless tool for transmitting and receiving continuous digital images during video teleconferences. The device could be used independently, more preferably in conjunction with a base/charger unit. Such a base/charger unit, could, for example, include a wide-angle, multi-directional digital camera, a video monitor/PC port, and a line power supply, and be linked to broadband communications, when necessary. In this manner, the capabilities of a miniature communications device can be further augmented and it can be used for extended periods of time without concern for battery life.

In a further application, the portable two-way communications device could be used to compile a grocery list and subsequently order groceries for delivery. This would be implemented by selecting a pre-programmed "Grocery List" function on the communications device application menu. Thus, upon the final use of each grocery product, the product identification bar code printed on the product container or wrapper can be scanned for repurchase. When it is time to replenish pantry supplies, the "Grocery List" option is selected and a speed-dial number to an Internet web site can be "pressed." Once connected to the site, the accumulated product identification bar code numbers are automatically up-loaded. Several further options then become available. The user may next select a "Purchase" option, whereupon the user enter a biometrics attribute, or PIN into the device. This action will cause the shopping list to be forwarded to a local supermarket web site or the like, along with the user's authorizing credit card or debit card information, for list fulfillment and delivery or pick-up as may be arranged. The user may alternatively select a "Print" option whereupon the accumulated product numbers are compared to a product number database located at an Internet web site causing the adjective description of each product to be extracted and compiled in a text narrative list. The list is then forwarded to the user's e-mail address for download and print or directly back to the portable communication device which retransmits the list to a local printer via wireless, typically infrared, transmission. Alternatively, the list could be sent by fax to the user or to a store for list fulfillment. Of course, a docking station could be used which provides wired or infrared wireless access to a printer. Should the user also be taking advantage of web-based menu services which provide ingredient lists, the two lists could be compared and augmented prior to download and print or forwarding to a supermarket web site for fulfillment.

In yet another application, the miniature portable two-way communication device could be used to ensure the accurate ordering/reordering and purchase of drugs and medications. Once the user's valid prescription is on file at a drug store or on-line pharmacy, the user could employ the communication device to scan the medication's NDC number or other unique identifying indicia. Employing either OCR or, preferably, scanning a two dimensional matrix or bar code such as Data Matrix or PDF 417 or the like, the communication device could automatically interpret the NDC number, usage instructions, number of authorized refills, prescription number, and patient name. Subsequent to scanning a biometric attribute, or keying a PIN, this information could then be transmitted to the selected pharmacy, along with the user's credit card or debit card information, whereupon the order would be filled.

In another application of the invention, if a user were to witness a crime in progress, the portable two-way communication device could be pointed toward the crime scene, activate the digital imager in a video mode, and dial 911. The real-time image of the events being viewed could be conveyed contemporaneously to the police along with the precise coordinates of the present position. In this manner, the police would have an accurate assessment of the situation on the scene and the precise location of the crime. Assistance could be dispatched instantly and appropriately without a spoken word necessarily being exchanged.

In still another application, should the portable two-way communication device ever be stolen, the device could be remotely disabled in part or full, and its present location precisely determined. Further upon first activation of the unit by the thief, a voice print could be captured and a signal could be sent by the receiving station back to the miniature portable two-way communication device disabling all functionality, erasing the personal database, and forcing the device to remain in the "on" position. In this manner, the continuous signal emitted by the device to a network operator or internet node would enable law enforcement to track the location or movement of the device facilitating its recovery and apprehension of the thief.

In a further application, the portable two-way communications device could be used to acquire and display roadmap and travel assistance instructions. An interactive connection could be made to one of many Internet web-sites providing maps and driving instructions. The maps and driving instructions could be downloaded and displayed on the device screen, or alternatively on the larger display screen that would be provided with a car kit. At the same time, points of interest can be highlighted, restaurants and hotels located, or reservations made.

In another application, the portable two-way communications device could be used by delivery drivers and postal personnel for not only two-way voice communication and route directions, but also for parcel delivery verification, signature capture, and real-time update of central databases containing parcel track and trace information.

In another application, the portable two-way communications device could be used to transmit text and graphical data acquired by separate, special-purpose, equipment such as portable electro-cardiogram machines, other medical devices, such as scales, EEG, glucose monitors, spirometers, or other electro-optical devices. Interface compatibility enables the portable two-way communications device to receive infrared, radio frequency, or other short-range signals from special purpose equipment for conversion and retransmission of the signal via radio frequency to networks and locations throughout the world.

One skilled in the art will appreciate that the present invention can be practiced by other than the embodiments disclosed herein, which embodiments are presented for purposes of illustration and not of limitation. Further, it should be understood that the specific examples and parameters are to be deemed representative and nonlimiting.

I claim:

1. A multi-function integrated semiconductor device comprising:
a single integrated circuit containing:
an image sensor including a plurality of light sensitive pixels for capturing an image in still and full-motion digital imaging;
a real-time image processing circuit, responsive to the light sensitive pixels, having as an output a digital representation of the image captured;
an automatic identification circuit within the real-time image processing circuit, responsive to a captured image, to generate an automatic identification indicia of a biometric attribute from a digitized image of said biometric attribute;
a personal database secure to all but a specified user;
means for providing a wireless communication including an antenna, a transmitter, a receiver, a wireless communication protocol and an Internet browser; and
memory containing a first automatic identification indicia of a biometric attribute of the specified user and software for executing a predetermined application.

2. The device of claim 1 further comprising means for inputting the biometric attribute; means for deriving a second automatic identification indicia from said inputted biometric attribute; and means for comparing said second automatic identification indicia to the first automatic identification indicia and permitting the specified user access to the secure personal database in response to the second automatic identification indicia matching the first automatic identification indicia.

3. The device of claim 1 further comprising a lens disposed to project an image on said image sensor, a digital processing unit, and an input/output means for transmitting the digital representation of a captured image to a remote device, wherein the digital processing unit is integrated with a first memory and the image processing circuit interrogates the captured image in real-time in said memory.

4. The device of claim 3, further comprising:
an interface for a voice/data communications channel to a networked computer server, said communications channel comprising at least one of the group consisting of a cellular telephone network, a satellite telephone network, a wide-area network, a local-area network, and the Internet browser;
wherein the image processing circuit further comprises means for capturing single and sequential digital images, and wherein the digital processing unit comprises means for transmitting said images including data element identifiers via the interface strikeout through the slash over the communications channel to a remote location;
wherein the personal database comprises personal identification and credit card, debit card or bank account information; and
a digital processor operable to transmit queries, receive textual and graphic responses, execute secure purchase of goods or services, and remotely store records related to electronic commerce transactions, and to execute the secure purchase of non-electronic commerce goods and services;
wherein the multi-function integrated semiconductor device is incorporated within a wireless communications product.

5. The device of claim 4 wherein the digital processor further comprises means for generating and transmitting a digital security code based on an input biometric attribute and incorporating data element identifiers.

6. The device of claim 4 wherein the digital processor further comprises means for activating a large scale processing application on a remote server.

7. The device of claim 4 wherein the digital processor further comprises means for securely executing personal financial transactions.

8. The device of claim 4, further comprising:
means for real-time scanning, decoding, and transmitting via the interface, information encoded in an automatic identification indicia, said indicia being selected from among the group consisting of bar codes, matrix codes, Optical Character Recognition (OCR), a handwritten message, a typed message, a symbol, a signature, and Radio Frequency Identification Tags (RFID).

9. The device of claim 1 further comprising a supplemental memory, a digital processing unit, a lens disposed to project an image on said image sensor, and an input/output means for transmitting the digital representation of a captured image to a remote device, wherein the digital processing unit is integrated with the memory, the supplemental memory, and the real-time image processing circuit and stores the digital representation image in one of the memory and the supplemental memory.

10. The device of claim 1 wherein the automatic identification circuit is further responsive to said captured digitized image to identify a non-biometric automatic identification indicia coded within the digitized image.

11. The device of claim 10 wherein the non-biometric automatic identification indicia is selected from among the group consisting of a bar code, a matrix code, optical character recognition, a handwritten message, a typed message, a symbol, a signature, and a radio frequency identification tag.

12. A wireless communications system comprising:
a multi-function integrated semiconductor device comprising a single integrated circuit having:
an image sensor including a plurality of light sensitive pixels for capturing an image in still and full-motion digital imaging;
a real-time image processing circuit, responsive to the light sensitive pixels, having as an output a digital representation of the image captured separate from said image captured;
a digital processing unit;
an automatic identification circuit within the real-time processing circuit, responsive to a captured image, to generate an automatic identification indicia of a biometric attribute from a digitized image of said biometric attribute in real-time;
a personal database secured to all but a specified user;
means for inputting the biometric attribute;
means for providing a wireless communication including an antenna, a transmitter, a receiver, a wireless communication protocol and an Internet browser;
a memory containing a first biometric attribute and software for executing a predetermined application; and
a supplemental memory, a lens disposed to project an image on said image sensor, and an input/output means for transmitting the digital representation of a captured image to a remote device, wherein the digital processing unit is integrated with the second memory, the supplemental memory, and the real-time image processing circuit in a single integrated circuit module and said digital processing unit stores the captured image in one of the memory and the supplemental memory; and a communication node capable of receiving digital images transmitted via said module, said communication node being remote from said module.

13. The device of claim 12 wherein the automatic identification circuit is further responsive to said captured digitized image to identify a non-biometric automatic identification indicia coded within the digitized image.

14. The device of claim 13 wherein the non-biometric automatic identification indicia is selected from among the group consisting of a bar code, a matrix code, optical character recognition, a handwritten message, a typed message, a symbol, a signature, and a radio frequency identification tag.

15. A portable wireless communications device comprising a multi-function integrated semiconductor device having integrated in a single integrated circuit a personal database secure to all but a specified user, a sensor responsive to a biometric attribute, a processor responsive to said biometric sensor and said secure personal database for verifying the biometric attribute of said specified user sensed by said biometric sensor, and granting said specified user access to said secure personal database on biometric verification, and means for transmitting to a remote location a copy of said sensed biometric attribute in response to a failure to verify said biometric attribute.

16. A portable wireless communications device comprising a multi-function integrated semiconductor device having integrated in a single integrated circuit a personal database secure to all but a specified user, a sensor responsive to a biometric attribute, and a processor responsive to said biometric sensor and said secure personal database for verifying the biometric attribute of said specified user sensed by said biometric sensor, and granting said specified user access to said secure personal database on biometric verification, wherein the processor further comprises an automatic identification circuit responsive to a captured image to identify a non-biometric automatic identification indicia coded within the digitized image, said non-biometric automatic identification indicia being selected from among the group consisting of a bar code, a matrix code, optical character recognition, a handwritten message, a typed message, a symbol, a signature, and a radio frequency identification tag.

17. A portable wireless communications device comprising a multi-function integrated semiconductor device having integrated in a single integrated circuit a personal database secure to all but a specified user, said database containing a biometric automatic identification indicia associated with a specified user, a sensor responsive to a biometric attribute, and a processor responsive to said biometric sensor and said secure personal database for verifying the biometric attribute of said specified user sensed by said biometric sensor, and granting said specified user access to said secure personal database on biometric verification, and means for transmitting to a remote location said biometric automatic identification indicia in response to a failure to verify said biometric attribute.

18. A multi-function integrated semiconductor device comprising:

a single integrated circuit containing:

an image sensor including a plurality of light sensitive pixels for capturing an image in still and full-motion digital imaging;

a real-time image processing circuit, responsive to the light sensitive pixels, having as an output a digital representation of the image captured;

an automatic identification circuit within the real-time image processing circuit, responsive to a captured image, and further responsive to said captured digitized image to identify a non-biometric automatic identification indicia coded within the digitized image;

means for providing a wireless communication including an antenna, a transmitter, a receiver, a wireless communication protocol; and memory and supplemental memory for executing a predetermined application.

19. The device of claim 18 wherein the non-biometric automatic identification indicia is selected from among the group consisting of a bar code, a matrix code, optical character recognition, a handwritten message, a typed message, a symbol, a signature, and a radio frequency identification tag.

* * * * *